United States Patent [19]
Gibb

[11] Patent Number: 4,936,064
[45] Date of Patent: Jun. 26, 1990

[54] FIREPROOF PANEL

[75] Inventor: John F. Gibb, Littleton, Colo.

[73] Assignee: Backer Rod Manufacturing and Supply Company, Denver, Colo.

[21] Appl. No.: 311,965

[22] Filed: Feb. 16, 1989

[51] Int. Cl.$^5$ .............................. E04H 9/00; B28B 3/00
[52] U.S. Cl. ................................ 52/232; 52/1;
52/404; 52/741; 110/336; 106/DIG. 2;
106/711; 264/333; 428/921
[58] Field of Search .................. 52/232, 1, 474, 486,
52/506, 512, 741, 404, 220, 221; 110/331–336,
233; 428/264–268, 272–275, 494, 500, 921;
264/333; 106/89–99, 111, 116, DIG. 2; 156/71

[56] References Cited

U.S. PATENT DOCUMENTS

| | | | |
|---|---|---|---|
| 3,185,297 | 5/1965 | Rutledge | 52/232 X |
| 3,493,460 | 2/1970 | Windecker . | |
| 3,830,687 | 8/1974 | Re et al. . | |
| 4,109,423 | 8/1978 | Perrain | 52/232 X |
| 4,159,302 | 6/1979 | Greve et al. . | |
| 4,270,326 | 6/1981 | Holter et al. . | |
| 4,273,821 | 6/1981 | Pedlow | 52/232 X |
| 4,307,546 | 12/1981 | Dolder | 52/232 X |
| 4,419,535 | 6/1983 | O'Hara | 52/232 X |
| 4,473,015 | 9/1984 | Hounsel | 110/336 |

FOREIGN PATENT DOCUMENTS 2162251 6/1973 Fed. Rep. of Germany ........ 52/232

Primary Examiner—Richard E. Chilcot, Jr.
Attorney, Agent, or Firm—Klaas & Law

[57] ABSTRACT

A fireproof panel for closing structural openings within building structures such as those between rooms, floors, ceilings, and the like through which essential-service hardware such as ducts, pipes, electrical conduit, and the like penetrates, or for providing support for such hardware. The panel comprises a solid matrix of refractory material having reinforcement material embedded therein. Preferably, the reinforcement material is embedded immediately beneath essentially all of at least one of the panel's front and back exterior surfaces. A preferred reinforcement material is a fiberglass material, preferably embedded immediately beneath both the front and back exterior surfaces of the panel. The reinforcement material inhibits fracture of the panel to thereby provide a greater workability in panel installation. The panel can be flat or shaped in accord with its intended function, and openings therethrough to accommodate penetrating hardware can be readily made.

22 Claims, 2 Drawing Sheets

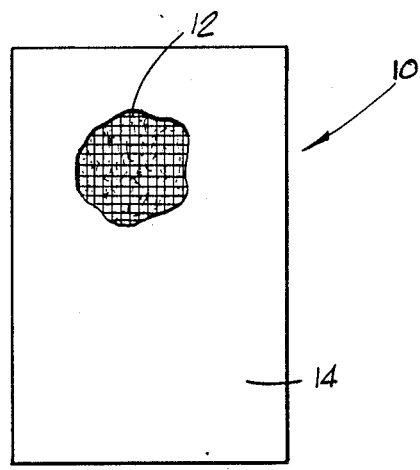
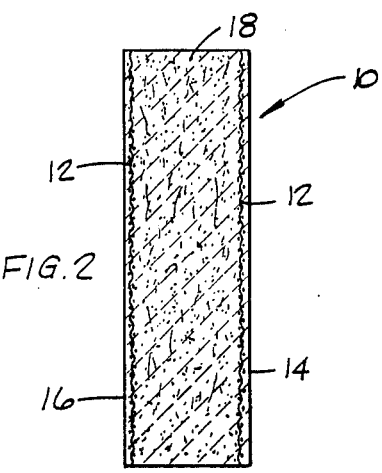
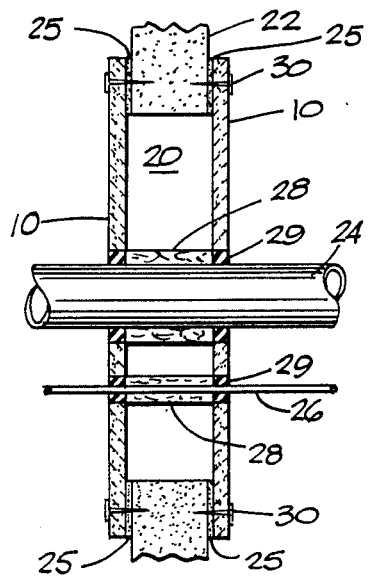
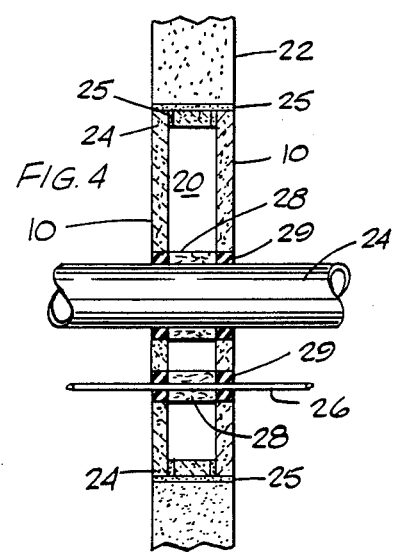
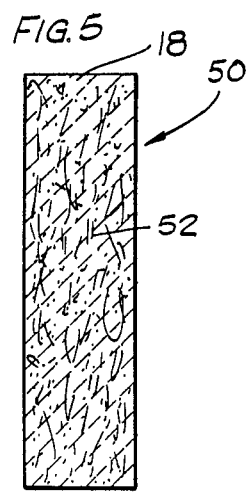
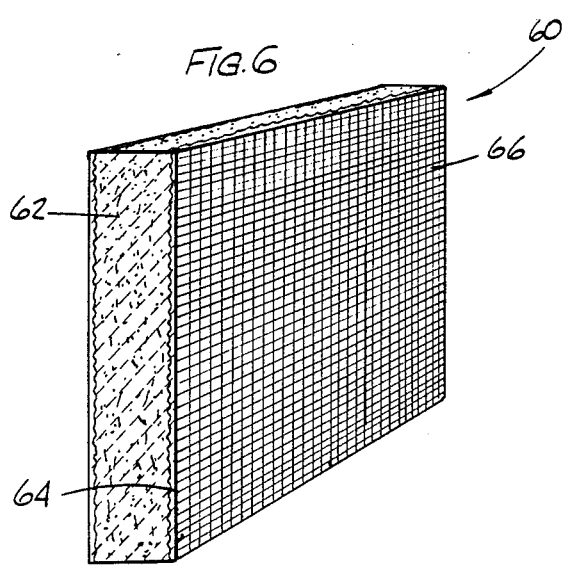

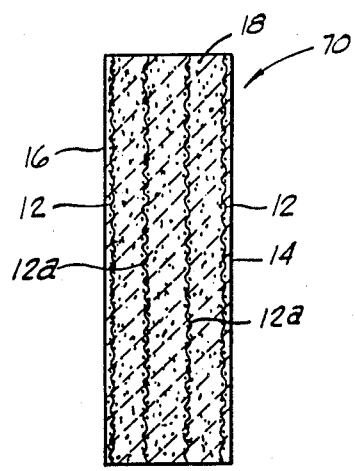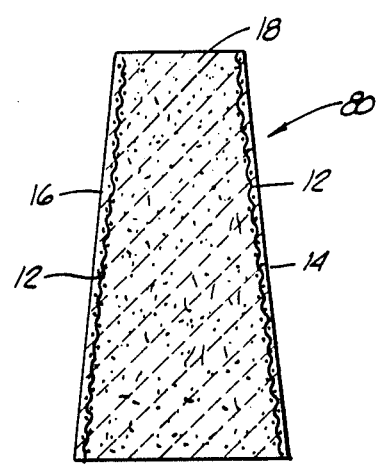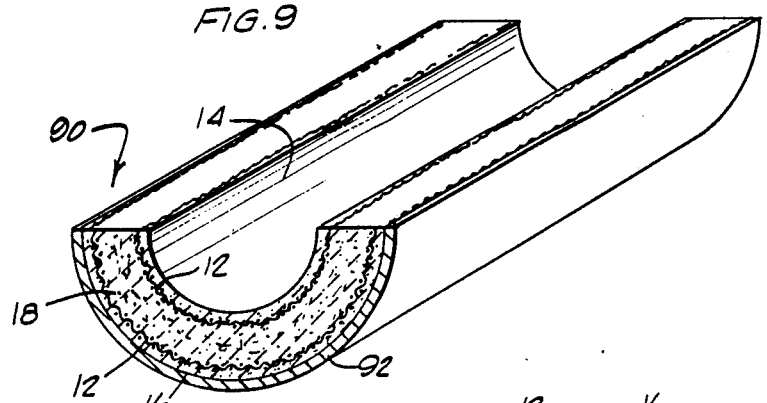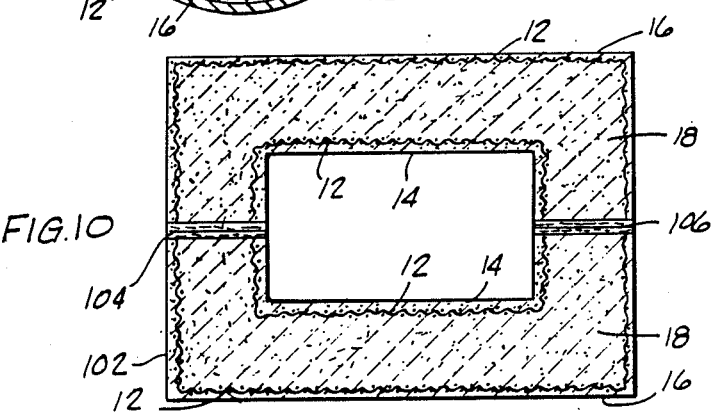

FIREPROOF PANEL

BACKGROUND OF THE INVENTION

This invention relates in general to a fireproof panel, either flat or shaped, and a method for closing structural openings through which service hardware, such as pipe, electrical conduit, ducts, and the like, penetrates between rooms, floors, ceilings and the like in buildings, and in particular to fireproof panels comprising refractory material having embedded therein reinforcement material to enhance physical strength and fracture resistance.

In most building structures, there are structural openings in walls, floors, ceilings, or other building structure components through which items such as plumbing pipes, electrical conduit, cable trays, heating and air conditioning ducts, and the like penetrate and extend from room to room or floor to floor. As is apparent, these openings are a safety hazard if a fire breaks out in one section of the building since the fire itself or its harmful by-products can easily spread throughout the entire structure by passing through the above-described openings. Further, such travel can occur irrespective of the fireproof qualities of the building structure components themselves. As a result, most fire codes now require that these openings be closed, and that they be closed with material whose resistance to fire, heat and gases (e.g. smoke) is at least equal to the resistance of the wall, floor, ceiling, or other structural components themselves.

Some current approaches employed for closing the above-described openings include sheet metal closures and silicone foam closures. The former requires somewhat complicated metal working procedures wherein a metal sheet is bolted to the structure surrounding an opening and penetrating items reside therethrough with a final tolerance therearound of zero. The latter approach, silicone foam closures, requires that a temporary dam be constructed on each side of the opening after the penetrating items are in place and then introducing the foam into the opening. After foam curing, the dam is removed.

In addition to requirements for closing structural openings as described, fireproof support structures are many times needed in high temperature applications to support pipes, cable trays, ducts, and the like. The invention subject matter here described can also be employed in providing such support functions.

It is therefore a primary object of the present invention to provide a fireproof panel constructed of refractory material for closing structural openings through which items penetrate. Another object of the present invention is to provide a fireproof panel constructed of refractory material which is reinforced to thereby enhance physical strength and fracture resistance. Yet another object of the present invention is to provide a reinforced fireproof panel for closing structural openings which can be readily worked with traditional building tools to attain desired fit and placement. A further object of the present invention is to provide a method for closing openings through which items penetrate within a building structure by employing fireproof panels constructed of reinforced refractory material. Still another object of the present invention is to provide shaped fireproof panels for use as support structures for similarly-shaped components such as pipes, ducts and the like. These and other objects of the invention will become apparent throughout the description which now follows.

SUMMARY OF THE INVENTION

The present invention is a fireproof panel, either flat or shaped, and a method for closing structural openings within building structures such as those between rooms, floors, ceilings and the like through which essential-service hardware, such as ducts, pipes, electrical conduit, and the like, penetrates. The panel comprises a solid matrix of rigid refractory material having reinforcement material embedded therein Preferably, the reinforcement material is embedded immediately beneath essentially all of at least one, and most preferably both, of the panel's front and back exterior surfaces. The reinforcement material can also be embedded essentially uniformly throughout the refractory material, or can be embedded therein in a layered symmetrical pattern. The reinforcement material inhibits fracture of the panel to thereby provide (1) efficient shipping and handling; (2) cutting and shaping with common tools such as saws, files, drills, and the like; (3) use of traditional installation hardware such as bolt fasteners, screws, nails, metal studs and the like for panel fastening; and (4) panel integrity tending to hold the panel together during severe fire and hose stream tests such as that performed under ASTM standards E-814 and/or E-119, for example.

A preferred reinforcement material is a fiberglass material, either woven or unwoven, and preferably embedded immediately beneath both the front and back exterior surfaces, which is sufficiently open in structure so that the refractory material can knit together during manufacture through the open areas between the fibers. Alternatively, and dependent on application requirements, the fiberglass material can be substituted or combined with other reinforcing materials such as, but not limited to, a woven wire mesh material, mineral fibers such as mineral wool or ceramic fibers, or, if heat resistance is not critical, various organic fiber materials. In an alternate embodiment which provides a lesser magnitude of reinforcement strength, the reinforcement material can be distributed throughout the refractory material during manufacture. Finally, should additional reinforcement strength be required for handling and installation purposes, extra reinforcement material can be placed within the panel or laminated to one or both surfaces of a panel already having embedded therein reinforcement material using, for example, but not limited thereto, conventional plastic laminating resins.

Because the reinforced panels are easily workable with tools, the structural openings through which essentialservice hardware pass can be closed by simply cutting the required number of appropriately-sized holes within an appropriately-sized panel within which the hardware then is made to penetrate by fitting the panel therearound. The panel then is flush-mounted and fastened within the opening, or is of a size to permit its overlapping periphery to be fastened to the adjacent wall floor or ceiling of the building structure. A noncombustible filler is packed at the interface of the hardware and the panel to thereby entirely close the opening in the panel through which the hardware penetrates. In this manner, building structure openings are closed to maintain a fireproof condition.

BRIEF DESCRIPTION OF THE DRAWINGS

Illustrative and presently preferred embodiments of the invention are shown in the accompanying drawings in which:

FIG. 1 is a front elevation view of a fireproof panel, partially in section;

FIG. 2 is an end elevation view in section of a portion of the panel of FIG. 1;

FIG. 3 is an end elevation view in section of a portion of a wall having an opening therethrough closed with overlapping fireproof panels;

FIG. 4 is an end elevation view in section of a portion of a wall having an opening therethrough closed with flushmounted fireproof panels;

FIG. 5 is an end elevation view in section of a second embodiment of a fireproof panel;

FIG. 6 is a front perspective view of a third embodiment of a fireproof panel;

FIG. 7 is an end elevation view in section of a fourth embodiment of a fireproof panel;

FIG. 8 is an end elevation view in section of a fifth embodiment of a fireproof panel;

FIG. 9 is a perspective view in section of a fireproof panel shaped as a pipe support; and FIG. 10 is an end elevation view in section of two fireproof panels cooperating with each other and shaped to surround and support a hardware component.

DETAILED DESCRIPTION OF PREFERRED EMBODIMENTS

Referring to FIGS. 1 and 2, a fireproof panel 10 having reinforcement material 12 embedded immediately beneath its front exterior surface 14 and back exterior surface 16 to enhance fracture resistance is shown. The panel 10 is a solid matrix of conventional rigid refractory material 18 preferably comprising aluminum oxide, silicon dioxide, sodium silicate, perlite and a refractory cement, and other minor inorganic materials which are blended in proper proportions with water as known in the art to produce a panel capable of withstanding temperatures up to and including 2200° F. in continuous service. Density of the refractory material 18 is preferably no greater than about 50 lbs per cubic foot. In addition, the panel 10 is of unitary construction, with the rigid refractory material 18 constituting a solid matrix in the form of a single, integral unit extending continuously from the front exterior surface 14 to the back exterior surface 16 as illustrated in FIG. 2. Reinforcement material 12 preferably comprises woven fiberglass having between about 1.6 and about 8 ounces per square yard density and disposed immediately beneath essentially all of the exterior surface of the panel 10. The preferred reinforcement material 12 can be constructed from open weave fiberglass by conventional fiberglass weaving techniques known in the art. In the embodiment shown, the material 12 has an open square weave formed by a plurality of longitudinally extending fiberglass strands weavingly intermeshed with a plurality of transversely extending strands. The strands can have a thickness of between about 0.004 inch and 0.01 inch. In the embodiment here shown, the woven fiberglass is manufactured by J.P. Stevens Fabric Co., Greenville, S.C., style no. 1659. Of course, products provided by other manufacturers can be employed. While woven fiberglass is here shown, it is to be understood that the reinforcement material can be other than woven fiberglass, and can include unwoven fiberglass, wire mesh, woven or unwoven ceramic or mineral wool fibers, combinations thereof, or any other non-combustible reinforcement material as would be recognized to achieve the objects of this invention. The reinforcement material 12 can be present beneath only one of the front or rear panel surfaces, but is preferably beneath both surfaces as here illustrated.

Construction of the panel 10 is preferably accomplished by use of a mold. During manufacture, the refractory material 18 is a hydrating-type material similar to concrete, and therefore can be cast in a mold, rammed in a mold, or pressure-molded. For best results, but not absolutely necessary, the reinforcing material is pre-impregnated prior to placement in the mold. After placement, a main charge of refractory material 18 is properly introduced into the mold, and the entire mass is permitted to cure. Thereafter, the mold is removed and the panel 10 is ready for service. Preferably, the panel 10 has a thickness of about one inch, but can be made in lesser or greater thicknesses as desired or required for a particular application. As is apparent, of course, the thinner the panel is, the greater the heat transfer therethrough will be during a fire.

FIGS. 3 and 4 illustrate the use of a panel 10 in two applications. Specifically, FIG. 3 shows two panels 10 which are larger than a structural opening 20 through building structure component such as a wall 22 of a building structure, with one panel 10 on each side of the opening 20 to thereby close both sides thereof. A typical heating duct 24 and electrical wiring 26 are shown to penetrate the panels 10 as this hardware extends as from room to room in a building. In the installation shown in FIG. 3, two approaches are available for closing the opening 20. First, if the penetrating items are already in place, the appropriate number of properly-sized holes can be cut into the panels 10 to accommodate the penetrating items. The panels 10 are sized to overlap the opening for face mounting and then are placed around the penetrating items. The respective overlapping peripheries of the panels 10 are fastened to the wall 22 with a known high-temperature adhesive 25, and fastening can be supplemented with conventional mechanical fasteners 30 such as nails (as here illustrated), screws, bolts, and metal studs. Use of the adhesive 25 ensures a gas-tight seal at the interface of the panels 10 and the wall 22. The second approach for closing the opening 20 is to fasten the panels 10 prior to the placement of the penetrating items. The overlapping peripheries of the panels 10 are fastened to the wall 22 as described above. Subsequently, an appropriate number of properly-sized holes are made in the panels 10 and the penetrating items are then passed through these holes. Because the panels 10 are reinforced as earlier described and therefore have enhanced resistance to fracture, tools such as saws, drills, and other invasive devices can be used to provide the required openings through the panels 10 before or after they are in place.

FIG. 4 exemplifies a second application of a panel 10 in closing a structural opening. As there shown, panels 10 can be flush-mounted within the boundaries of an opening 20 through a wall 22 while service hardware penetrates the panels 10. Once again, as with the overlapping mount as shown in FIG. 3, the panels 10 can first have holes cut therethrough to accommodate the hardware and then be placed in the opening 20, or they can first be placed in the opening 20 and then be cut to accommodate the hardware. A high-temperature adhesive 25 is applied to the entire interfacing surfaces of the edges of the panels 10 and the adjacent inner edges of the opening 20 to thereby fasten the panels 10 in place. As shown in FIG. 4, at least two oppositely disposed stop means such as spacer blocks 24, which are preferably constructed the same as the panel 10, are inset within the opening as shown and fastened with a high-temperature adhesive 25 and/or mechanical fasteners within the opening 20. These spacer blocks 24 are inset inwardly into the opening 20 a distance essentially equal to the thickness of each panel 10 to thereby prohibit panel movement there beyond and assure a flush mount of the exterior surface of each panel 10 with each exterior surface of the wall 22. A high-temperature adhesive 25 can be applied to those interfacing surfaces of the spacer blocks 24 and the panels 10 for added securement. Face mounting, as illustrated in FIG. 3, is appropriate for closing structural openings in sheetrock (drywall), concrete-panel and concrete block assemblies. Flush mounting, as illustrated in FIG. 4, is appropriate for closing openings in concretepanel and concrete block assemblies wherein the spacer blocks 24 can be employed, but is not appropriate for closing openings in sheetrock (drywall) assemblies because of the hollow space therebetween. In all cases, a noncombustible filler 28, as exemplified, but not limited to, that as described in U.S. Pat. Nos. 4,622,251 or 4,756,945, both incorporated herein by reference, is packed along the length of the hardware within the structural opening. Disposed and packed at the interface between the hardware and the panels 10 to thereby entirely close the holes in the panels 10 through which this hardware penetrates is a fireproof sealant 29. Non-limiting examples of sealant 29 include an inorganic product such as "Metalcaulk," manufactured by Metalline Co., Oklahoma City, Okla., or an elastomeric silicone product such as "Fire Stop" silicone sealant manufactured by Dow Corning Co., Midland, Mich.

Referring to FIG. 5, a second embodiment of a fireproof panel 50 is shown wherein reinforcement material 52 is essentially uniformly distributed throughout a solid matrix of conventional refractory material 18. The reinforcement material 52 is preferably unwoven fiberglass strands present in an amount of between about 1.6 and about 8 ounces per square yard density, but may also be chosen from fibers such as ceramic or mineral wool fibers, combinations thereof, or any other reinforcement material as would be recognized as having such utility. As is apparent, the reinforcement material 52 must be mixed with the malleable refractory material 18 during manufacture. This mixture is then placed in a mold for curing.

FIG. 6 illustrates a third embodiment of a fireproof panel 60. In this embodiment, the panel 60 comprises a core component 62, which is preferably identical to the earlierdescribed panel 10, and an exterior laminated component 64 comprising additional reinforcement material 66 held in place by a conventional plastic laminating resin or by other suitable adhesion. The reinforcement material 66 is preferably identical to the reinforcement material 12 as described above, but may also be chosen from other reinforcement materials as would be apparent for the purposes herein related. Because of the exterior laminated component 64, the panel 60 has additional reinforcement strength for shipping and handling purposes while providing the same closure and fire retarding qualities of the earlier-described panel 10. It is to be noted that installation procedures and fireproof qualities for the embodiments of FIGS. 5 and 6 are identical to those of the embodiment shown in FIGS. 1-4.

FIG. 7 illustrates a fourth embodiment of a fireproof panel 70 constructed identically to the embodiment of FIGS. 1 and 2, except that the panel 70 has additional symmetrical layers of reinforcement material 12a disposed within the refractory material 18 as shown and identical to the reinforcement material 12 embedded beneath the front and back exterior surfaces 14, 16 of the panel 70. The additional reinforcement material 12a further enhances fracture resistance of the panel 70, but does not impair panel workability.

FIGS. 8, 9 and 10 exemplify the shapeablity of the panel construction herein disclosed. Thus, referring to FIG. 8, a tapered panel 80 having non-parallel front and back exterior surfaces 14, 16 can be constructed through use of an appropriate mold. Likewise, as shown in FIG. 9, a panel 90 has parallel front and rear exterior surfaces through a plurality of planes so as to be shaped as a pipe support wherein the respective exterior walls 14, 16 are curved in accord with a chosen mold. If desired, the panel 90 can be encased in metal or can have a metal sheet 92 attached thereto. FIG. 10 illustrates yet another embodiment wherein cooperatively-shaped panels 100, 102 can surround hardware such as ducts, cable trays, or the like in a fireproof manner. As is shown, the panels 100, 102 interface with each other at sites 104 and 106, and can be cemented together at the interfaces if required or desired. In each of the embodiments of FIGS. 8-10 the reinforcement material 12 and the refractory material 18 are identical to those described in relation to FIGS. 1 and 2. The reinforcement material 12 is likewise embedded beneath both the front and back surfaces 14, 16 thereof. It is to be understood, however, that reinforcement material and its arrangement for any of the embodiments of FIGS. 8-10 can be any of those previously described in relation to any of the preceding embodiments.

While illustrative and presently preferred embodiments of the invention have been described in detail herein, it is understood that the inventive concepts may be otherwise variously embodied and employed and that the appended claims are intended to be construed to include such variations except insofar as limited by the prior art.

What is claimed is:

1. A fireproof member adapted for closing a structural opening through a wall of a building comprising:
   a rigid panel having front and back exterior surfaces, said panel being manufactured of a solid matrix of refractory material in the form of a single, integral unit extending continuously from said front exterior surface to said back exterior surface; and
   a layer of woven reinforcement material embedded within said panel immediately beneath said front and back exterior surfaces.

2. The invention as claimed in claim 1 wherein the reinforcement material is a fiberglass material.

3. The invention as claimed in claim 2 wherein the fiberglass material is from about 1.6 ounces to about 8 ounces per square yard density.

4. The invention as claimed in claim 1 and wherein essentially all of at least one of the front and back exterior surfaces has laminated thereto reinforcement material.

5. The invention as claimed in claim 4 wherein the reinforcement material is a woven fiberglass material.

6. The invention as claimed in claim 5 wherein the fiberglass material is from about 1.6 ounces to about 8 ounces per square yard density.

7. The invention as claimed in claim 1 wherein the front and back exterior surfaces of the panel are parallel with each other.

8. The invention as claimed in claim 7 wherein the panel has a single plane.

9. The invention as claimed in claim 7 wherein the panel has a plurality of planes.

10. The invention as claimed in claim 1 wherein the front and back exterior surfaces of the panel are not parallel with each other.

11. A method for closing a structural opening through a building structure component within a building structure and through which essential-service hardware items penetrate in extending from place to place within the building structure, said method comprising:
(a) providing two rigid fireproof panels each having front and back exterior surfaces, each of said panels comprising a solid matrix of refractory material and further comprising at least one portion of reinforcement material embedded within said panels between said front and back exterior surfaces thereof, each of said panels being of a size which is larger than the structural opening to be closed to thereby provide peripheries which overlap the opening on all sides when the panels are in place to close the opening;
(b) spacing and cutting an appropriate number of holes through each panel to correspond with the number, size and site of penetrating hardware items when each panel is in place to close the opening;
(c) placing one panel over the opening on one side of the building structure component such that the penetrating hardware items extend through the holes in the panel, and fastening the overlapping periphery of the panel to the building structure component adjacent thereto;
(d) placing the other panel over the opening on the other side of the building structure component such that the penetrating hardware items extend through the holes in the panel, and fastening the overlapping periphery of the panel to the building structure component adjacent thereto;
(e) packing along the length of the hardware items within the opening a non-combustible filler; and
(f) packing a fireproof sealant at the interface between each panel and the penetrating hardware items to thereby entirely close the holes in the panels through which the items penetrate.

12. A method for closing a structural opening through a building structure component within a building structure and through which essential-service hardware items penetrate in extending from place to place within the building structure, said method comprising:
(a) providing two rigid fireproof panels each having front and back exterior surfaces, each of said panels comprising a solid matrix of refractory material and further comprising at least one portion of reinforcement material embedded within said panels between said front and back exterior surfaces thereof, each of said panels being of a size which is essentially identical to the size of the opening to be closed when the panels are in place to close the opening;
(b) spacing and cutting an appropriate number of holes through each panel to correspond with the number, size and site of penetrating hardware items when each panel is in place to close the opening;
(c) insetting a distance essentially equal to the thickness of a panel from each side of the building structure component and fastening at least two oppositely disposed stop means within the opening for prohibiting panel movement there beyond;
(d) placing one panel within the opening on one side of the building structure component such that the penetrating hardware items extend through the holes in the panel, and fastening the edge of the panel to the building structure component adjacent thereto;
(e) placing the other panel within the opening on the other side of the building structure component such that the penetrating hardware items extend through the holes in the panel, and fastening the edge of the panel to the building structure component adjacent thereto;
(f) packing along the length of the hardware items within the structural opening a non-combustible filler; and
(g) packing a fireproof sealant at the interface between each panel and the penetrating hardware items to thereby entirely close the holes in the panels through which the items penetrate.

13. A method for closing a structural opening through a building structure component within a building structure and through which essential-service hardware items penetrate in extending from place to place within the building structure, said method comprising:
(a) providing two rigid fireproof panels each having front and back exterior surfaces, each of said panels comprising a solid matrix of refractory material and further comprising at least one portion of reinforcement material embedded within said panels between said front and back exterior surfaces thereof, each of said panels being of a size which is larger than the structural opening to be closed to thereby provide peripheries which overlap the opening on all sides when the panels are in place to close the opening;
(b) placing the panels over the respective opening on each side of the building structure component and fastening the overlapping periphery of each panel to the building structure component adjacent thereto;
(c) spacing and cutting an appropriate number of holes through the panels to correspond with the number, size and site of penetrating hardware items when said hardware items are in place;
(d) placing the penetrating hardware items in the holes of the panels;
(e) packing along the length of the hardware items within the opening a non-combustible filler; and
(f) packing a fireproof sealant at the interface between each panel and the penetrating hardware items to thereby entirely close the holes in the panels through which the items penetrate.

14. A method for closing a structural opening through a building structure component within a building structure and through which essential-service hardware items penetrate in extending from place to place within the building structure, said method comprising:
(a) providing two rigid fireproof panels each having front and back exterior surfaces, each of said panels comprising a solid matrix of refractory material and further comprising at least one portion of reinforcement material embedded within said panels between said front and back exterior surfaces thereof, each of said panels being of a size which is essentially identical to the size of the opening to be closed;

(b) insetting a distance essentially equal to the thickness of a panel from each side of the building structure component and fastening at least two oppositely disposed stop means within the opening for prohibiting panel movement there beyond;

(c) placing the panels within the opening on each side of the building component and fastening the respective edges of the panels to the building structure component adjacent thereto;

(d) spacing and cutting an appropriate number of holes through the panels to correspond with the number, size and site of penetrating hardware items when said hardware items are in place;

(e) placing the hardware items in the holes of the panels;

(f) packing along the length of the hardware items within the structural opening a non-combustible filler; and (g) packing a fireproof sealant at the interface between each panel and the penetrating hardware items to thereby entirely close the holes in the panels through which the items penetrate.

15. A fireproof building structure comprising:
a wall having first and second sides and an opening therethrough;
at least one essential-service hardware item extending through said opening; and
a rigid fireproof panel comprising a solid matrix of refractory material fixedly secured to at least one of said first and second sides of said wall in order to close said opening to thereby prevent the passage of fire therethrough, said panel being larger than said opening in said wall in an amount sufficient to enable said panel to completely cover said opening, said panel further comprising front and back exterior surfaces, at least one hole therethrough sized to receive said hardware item, and at least one portion of reinforcement material embedded within said panel between said front and back exterior surfaces thereof.

16. The building structure of claim 15 further comprising a non-combustible filler packed along the length of said hardware item within said opening.

17. The building structure of claim 15 further comprising a fireproof sealant positioned within said hole in said panel between said panel and said hardware item.

18. A fireproof building structure comprising:
a wall having first and second sides, and an opening therethrough;
at least one essential-service hardware item extending through said opening; and
a rigid fireproof panel comprising a solid matrix of refractory material fixedly secured within said opening in said wall in order to close said opening to thereby prevent the passage of fire therethrough, said panel being substantially identical in size to said opening in said wall in order to allow said panel to be received within said opening, said panel further comprising front and back exterior surfaces, at least one hole therethrough sized to receive said hardware item, and at least one portion of reinforcement material embedded within said panel between said front and back exterior surfaces thereof.

19. The building structure of claim 18 further comprising a non-combustible filler packing along the length of said hardware item within said opening.

20. The building structure of claim 18 further comprising a fireproof sealant positioned within said hole in said panel between said panel and said hardware item.

21. The building structure of claim 18 further comprising stop means within said opening in said wall for controlling the position of said panel within said opening.

22. A fireproof building structure comprising:
a wall having first and second sides and an opening therethrough;
at least one essential-service hardware item extending through said opening; and
a rigid fireproof panel fixedly attached to said wall in order to close said opening to thereby prevent the passage of fire therethrough, said panel having a size sufficient to completely close said opening, said panel comprising front and back exterior surfaces and being manufactured of a solid matrix of refractory material in the form of a single, integral unit extending continuously from said front exterior surface to said back exterior surface, said panel further comprising at least one hole therethrough sized to receive said hardware item, and a layer of woven reinforcement material embedded within said panel immediately beneath said front and back exterior surfaces.

* * * * *